Aug. 7, 1928.

C. G. HAWLEY 1,679,358

STEAM PURIFIER FOR LOCOMOTIVE BOILERS

Filed Nov. 28, 1924

Inventor

Patented Aug. 7, 1928.

1,679,358

UNITED STATES PATENT OFFICE.

CHARLES GILBERT HAWLEY, OF CHICAGO, ILLINOIS, ASSIGNOR TO CENTRIFIX CORPORATION, OF CLEVELAND, OHIO, A CORPORATION OF OHIO.

STEAM PURIFIER FOR LOCOMOTIVE BOILERS.

Application filed November 28, 1924. Serial No. 752,725.

My invention relates to the problem of removing moisture and solids in the steam leaving a locomotive boiler and entering the steam superheater or the engines. This particular invention has special reference to the problem as related to locomotive boilers having inside dry pipes and throttle valves which are located in their domes. Due to the violent evaporation of the water in the boiler, particularly as affected by the condition of the boiler water, the steam which reaches the throttle valve in the dome always conveys a large percentage or proportion of moisture globules and particles of solid matter. In speaking of solids, globules of oil and the like are included. If this moisture and these solids are permitted to pass into the dry pipe and thus into the superheater or directly into the engines many bad effects ensue. These are so well understood as to render a detailed discussion unnecessary. The purpose of this invention is to eradicate these bad effects by preventing the entrance of moisture and solids at the throttle valve. Incidentally, the invention comprehends the interruption of the travel of such impurities at that point and their return either to the boiler water or their discharge externally.

Figure 1:
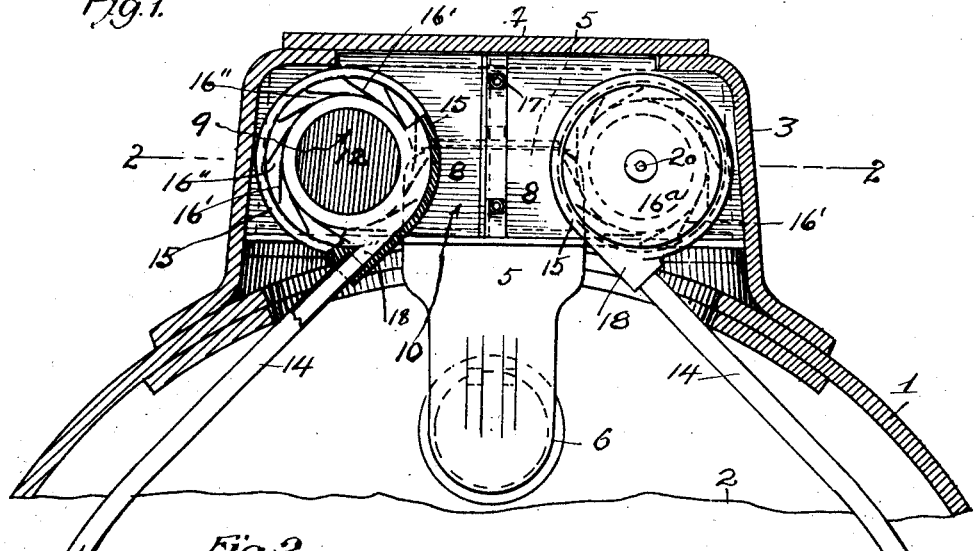
Figure 2:
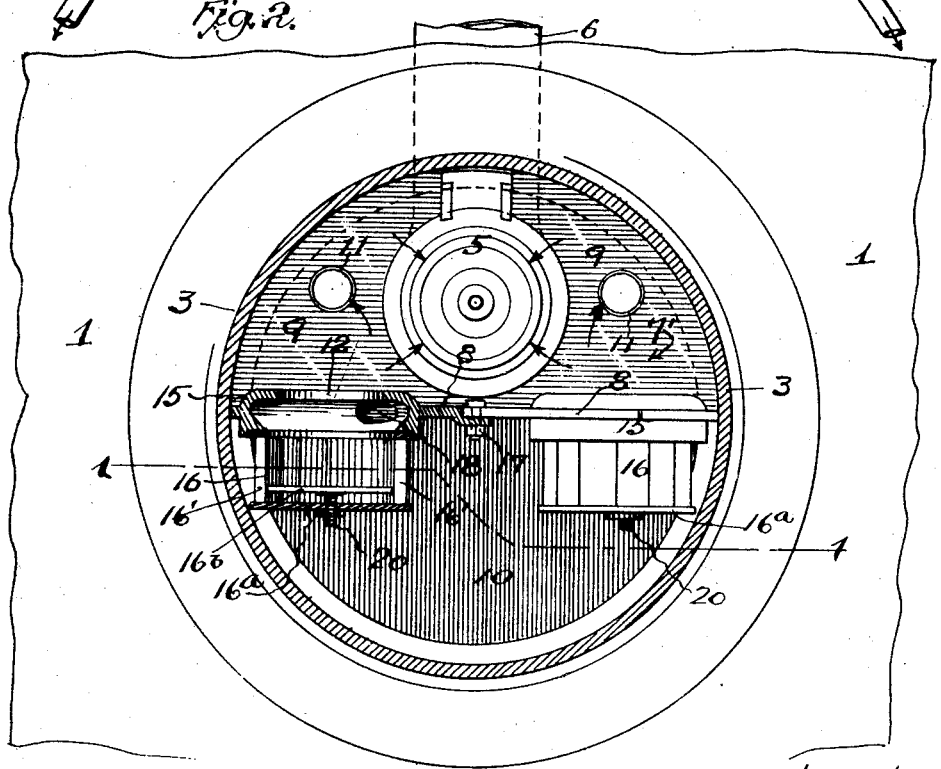

The invention comprises new constructions and effects, all of which will be clearly understood upon reference to the accompanying drawings and the following detailed description. In said drawings Fig. 1 is a cross-section elevation of the upper part of a locomotive boiler and its steam dome embodying this invention. Fig. 2 is a horizontal section thereof substantially on the line 2—2 of Fig. 1.

By reason of size, it has been necessary to limit the illustration to the dome portion of a locomotive boiler, but the presence of the remaining elements of the boiler and locomotive is assumed and such parts will be at once comprehended by those skilled in the art.

1 represents the shell of the boiler barrel. The line 2 may be taken as representing the level of the water in the boiler. The part 3 is the steam dome, having the usual dome cap 4. When the latter is removed a person may enter the boiler through the dome. In the lower forward part of the dome is the usual throttle box 5 which, as here shown, comprises the upper or receiving end of the dry pipe 6 leading to the engines. As shown, the top or end of the dry pipe containing the throttle valve rises nearly to the top of the dome.

The problem is to exclude steam conveyed moisture and solids from the throttle valve; that is, from the top of the throttle box. To this end, preferably, I divide the dome into two compartments by means of a half floor or horizontal partition 7' and a vertical middle partition 8. The floor has an opening which admits the throttle box. The joints around the parts 7 and 8 are made tight and the portion 9 of the dome cavity, including the throttle valve, will be referred to as the dry steam compartment; whereas the other half 10 of the dome cavity will be referred to as the wet steam compartment. The dry pipe 6 leads forward and thru the medium of other parts communicates with the valve chests of the locomotive engines. The parts 11 are auxiliary dry pipes extending down through the floor of the dry steam compartment and serve the auxiliary steam engines and appliances belonging to the locomotive. The raw steam rises through the compartment 10 and enters the compartment 9 through one or more openings 12 in the vertical partition 8. I prefer that there be two such openings, and at each opening 12 I provide a centrifugal steam purifying fixture which, while allowing the free progress of the steam from the compartment 10 into the compartment 9, effectually bars or prevents the passage of heavier substances conveyed by the raw steam. Each of these intercepting devices or fixtures is provided with a waste pipe 14, through which the collected heavier substances are discharged back into the body of the boiler. The invention, however, also comprehends the carrying of the waste pipes through the shell of the boiler and their connection with external traps, which serve to dispose of the collected substances, but prevent the free escape of steam through the pipes 14.

The typical centrifugal fixtures of my invention, as here shown, are identical, except that as most convenient one is of a right-hand and the other of a left-hand construction. Each fixture comprises two chief elements. First, the combination bowl or race 15 and second, the multiply tuyered ring or element 16. These are fixed and do not rotate. As a matter of fact, I prefer that the partition 8 shall be formed by web-like parts which are integral with the annular bowl portions 15. Conveniently, the partition forming webs overlap at the middle and are secured by bolts 17. Further, they are removable from the dome without disturbing the floor 7.

The members 16 occupy the wet steam compartment 10 and are preferably removable from the members 15. The parts are connected by bolts or clamps (not shown). When the dome cap 4 is off the members 16 may easily be removed, leaving ample space through which a workman may get down through the open half of the dome and onto the flues in the boiler. The bowls or race members 15 are internally larger than the tuyère rings 16 and will be referred to as expansion bowls or races. As clearly shown, the openings 12 are smaller than the tuyère rings. These openings, by the way, are formed in the members 15, the backs of which obviously form parts of the cross-partition 8.

At its periphery and at the bottom of the fixture each bowl member 15 is provided with a substantially tangential outlet opening or nozzle 18, to which the pipe 14 is connected. The raw steam enters the tuyère ring 16 tangentially and is thereby caused to set up a rotative action in the direction of the discharge nozzle 18. The rotative action is extremely rapid and results in the centrifugal separation of the heavier substances (water and solids) and their discharge through nozzle 18 and pipe 14, leaving only dry steam to escape into the compartment 9 through the central opening 12. In further explanation of this action attention is directed to the sectional portions of Figs. 1 and 2, from which it will be evident that each tuyère ring 16 is made up of a plurality or annular series of tangential blades 16′, forming the tangential slot-like tuyères 16″. The raw steam end of the tuyère ring is closed as by a fixed plate 16ª, or, as is preferred, by an adjustable end plate 16ᵇ about to be described. In either case, the steam can enter only through the tangential tuyères and hence the centrifugal action is dependably established within the tuyère ring and the expansion bowl.

I have referred to the movable end plates or bottoms 16ᵇ belonging to respective tuyère rings 16. Each part 16 is mounted upon a member or members 20, by which it may be moved longitudinally in the tuyère ring. These may be reached and adjusted at any time that the dome is open. By adjusting the parts 16ᵇ the capacity of the tuyère ring may be adjusted to the capacity of the throttle valve. As pointed out in my companion application S. N. 752,726, these adjustments may be made automatic in response to the movement of the throttle valve, but in the present instance I have illustrated only fixed adjustments. Such fixed adjustments, that is a tuyère adjustment preceding the closing of the dome, are especially convenient in the matter of adapting these centrifugal steam purifiers to throttle valves and engines of various sizes. Furthermore, they admit of the easy readjustment or regulation of the steam purifiers as required to obtain the best results with the locomotive. However, it is to be understood that my invention comprehends the adjustment of the centrifugal steam purifiers illustrated in other ways, and particularly from the exterior of the dome, to the end that the opening of the dome may be avoided except when access to the interior of the boiler is required.

A distinct advantage of the construction and arrangement herein illustrated is that it admits of the building of the steam purifier as a whole within steam domes of little height. In the case illustrated, this is the specific reason for the employment of two relatively small centrifugal steam purifiers in the upright partition, and the number in that partition may be increased or decreased at the will of the designer, provided only that the opening or openings 12 be of sufficient size in the aggregate to supply the throttle valve at all times without occasioning such a drop of pressure in the dry steam compartment as would cause that compartment to leak or its walls to buckle under a greater pressure in the boiler and wet steam compartment.

Having thus described my invention, I claim as new and desire to secure by Letters Patent:—

1. A locomotive boiler, its steam dome and dry pipe positioned in the latter, in combination with a partial floor in said dome, a vertical partition which, with said floor, divides the dome into wet and dry steam compartments, said dry pipe being located in the dry steam compartment, and a steam purifier opening through said vertical partition.

2. A locomotive boiler, its steam dome and dry pipe positioned in the latter, in combination with a partial floor in said dome, a vertical partition which, with said floor, divides the dome into wet and dry steam compartments, said dry pipe being located in the dry steam compartment, and a plurality of steam purifiers opening through said vertical partition.

3. A locomotive boiler and its steam dome, in combination with a dry pipe rising into said dome and leading forward from said dome, a partial floor in said dome and through which said dry pipe rises, one or more auxiliary dry pipes extending down through said floor, a vertical partition, which, with said floor, divides said dome into a wet steam compartment and a dry steam compartment, the latter containing the upper part of said dry pipe, a centrifugal steam purifying device positioned at an opening in said vertical partition and adapted to bar the entrance of steam conveyed substances heavier than the steam, and a drain leading from said fixture for the discharge of such substances.

4. A locomotive boiler and its steam dome, in combination with a partial floor in said dome, a dry pipe rising through said floor, a vertical partition rising from said floor and completing the enclosure of the top of the dry pipe, a plurality of steam admission openings in said vertical partition and a centrifugal steam purifier positioned at each said opening.

5. A locomotive boiler and steam dome in combination with horizontal and vertical walls dividing said dome into wet and dry steam compartments a throttle valve rising into said dry steam compartment, a centrifugal steam purifying fixture positioned on said vertical partition through which steam is admitted from the wet into the dry compartment, and means for adjusting the capacity of said fixture.

In testimony whereof, I have hereunto set my hand this 24th day of November, A. D. 1924.

CHARLES GILBERT HAWLEY.